US006938484B2

(12) United States Patent
Najafi et al.

(10) Patent No.: US 6,938,484 B2
(45) Date of Patent: Sep. 6, 2005

(54) MICROMACHINED CAPACITIVE LATERAL ACCELEROMETER DEVICE AND MONOLITHIC, THREE-AXIS ACCELEROMETER HAVING SAME

(75) Inventors: Khalil Najafi, Ann Arbor, MI (US); Junseok Chae, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 10/760,025

(22) Filed: Jan. 16, 2004

(65) Prior Publication Data

US 2004/0182155 A1 Sep. 23, 2004

Related U.S. Application Data

(60) Provisional application No. 60/440,567, filed on Jan. 16, 2003.

(51) Int. Cl.$^7$ ............................................. G01P 15/125
(52) U.S. Cl. .................................................... 73/514.32
(58) Field of Search ..................... 73/514.32, 514.18, 73/514.29, 514.16, 514.38

(56) References Cited

U.S. PATENT DOCUMENTS

| | | | | |
|---|---|---|---|---|
| 4,711,128 A | * | 12/1987 | Boura | ............... 73/514.18 |
| 6,035,714 A | | 3/2000 | Yazdi et al. | |
| 6,167,757 B1 | | 1/2001 | Yazdi et al. | |
| 6,286,369 B1 | | 9/2001 | Yazdi et al. | |
| 6,402,968 B1 | | 6/2002 | Yazdi et al. | |

FOREIGN PATENT DOCUMENTS

| | | |
|---|---|---|
| DE | 197 50 350 | 8/1999 |
| JP | 2001133479 | 5/2001 |
| JP | 2001264355 | 9/2001 |

OTHER PUBLICATIONS

Yazdi, Navid, et al., Micromachined Inertial Sensors, Proceedings of the IEEE, vol. 86, No. 8, Aug. 1998, pps. 1640–1659.
Yazdi, Navid, Micro–g Silicon Accelerometers with High Performance CMOS Interface Circuitry, EECS, 1999, The University of Michigan, Ann Arbor, Michigan.
Analog–Devices, ADXL50, Monolithic Accelerometer with Signal Conditioning, Data Sheet, 1996, pps. 1–15.
Analog Devices, ADXL105, High Accuracy +–1g to +–5g Single Axis Imems Accelerometer with Analog Input, 1999, pps. 1–8.
Lu, C., et al., A Monolithic Surface Micromachined Accelerometer with Digital Output, IEEE Journal of Solid–State Circuits, vol. 30, No. 12, Dec. 1995, pps. 1367–1373.
Boser, Bernhard E., et al., Surface Micromachined Accelerometers, IEEE Journal of Solid–State Circuits, vol. 31, No. 3, Mar. 3, 1996, pps. 366–375.
CROSS–BOW, High Sensitivity Accelerometer, LF Series Data Sheet, San Jose, California, 2001.

(Continued)

Primary Examiner—Helen Kwok
(74) Attorney, Agent, or Firm—Brooks Kushman, P.C.

(57) ABSTRACT

A high-sensitivity and low-noise micromachined capacitive lateral accelerometer device having an input axis and a monolithic, three-axis accelerometer utilizing the device are provided. The device includes at least one electrode having a side surface normal to the input axis. A relatively large proofmass has at least one side surface normal to the input axis and extends along a width of the proofmass. The proofmass is movable against acceleration relative to the at least one electrode due to inertial force along the input axis to obtain a capacitive variation between the at least one electrode and the proofmass. The side surfaces are spaced apart to define a narrow, high-aspect ratio sensing gap which extends along substantially the entire width of the proofmass. The proofmass forms a sense capacitor with the at least one electrode.

33 Claims, 5 Drawing Sheets

OTHER PUBLICATIONS

Luo, Hao, et al., A 1 mG Lateral CMOS–MEMS Accelerometer, 13$^{th}$ IEEE International Conference on Micro Electro Mechanical Systems, MEMS 2000, Miyazaki, Japan.

Wu, Jiangfeng, et al., A Low–Noise Low–Offsett Chopper–Stabilized Capacitive–Readout Amplifier for CMOS MEMS Accelerometers, IEEE International Solid State Circuits Conference ISSCC 2002, San Francisco, California.

Lemkin, M., et al., A Low–Noise Digital Accelerometer Using Integrated SOI–MEMS Technology, 10$^{th}$ International Conference Solid–State Sensors and Actuators, Transducers 1999, Sendai, Japan.

Ishihara, Kei, et al., An Inertial Sensor Technology Using DRIE and Wafer Bonding with Interconnecting Capability, Journal of Microelectromechanical Systems, vol. 8, No. 4, Dec. 1999, pps. 403–408.

Griffin, W.S., et al., A Study of Fluid Squeeze–Film Damping, ASME Journal of Basic Engineering, Jun. 1996, pps. 451–456.

Zhang, Xia, et al., Viscous Air Damping In Laterally Driven Microresonators, Proceedings of The IEEE Micro Electro Mechanical Systems, 1994, pps. 199–204.

Henrion, Widge, et al., Wide Dynamic Range Direct Digital Accelerometer, Wide Dynamic Range Direct Digital Accelerometer, Solid State Sensors and Actuators Workshop, Hilton Head Island, SC, 1990.

Yazdi, Navid, et al., All–Silicon Single–Wafer Micro–g Accelerometer with a Combined Surface and Bulk Micromachining Process, Journal of Microelectromechanical Systems, vol. 9, No. 4, Dec. 4, 2000, pps. 544–550.

Rudolf, F., et al., Precision Accelerometers with ug Resolution, Sensor and Actuators, A21–A23, 1990, pps. 297–302.

Maxwell, Peter et al., Design Through to Production of a MEMS digital Accelerometer for Seismic Acquisition, First Break, vol. 19, Mar. 3, 2001.

Xiao, Zhixiong, et al., Laterally Capacity Sensed Accelerometer Fabricated with the Anodic Bonding and the High Aspect Ratio Etching, 10$^{th}$ International Conference Solid–State Sensors and Actuators, Transducers 1999, Sendai, Japan.

Chae, Junseok, et al., A Hybrid Silicon–On–Glass (SOG) Lateral Micro–Accelerometer With CMOS Readout Circuitry, 15$^{th}$ IEEE International Conference on Micro Electro Mechanical Systems, MEMS 2002, Las Vegas, Nevada.

Yazdi, Navid, et al., An All–Silicon Single–Wafer Fabrication Technology For Precision Microaccelerometers, 9$^{th}$ International Conference Solid–State Sensors and Actuators, Transducers 1997, Chicago, IL, pps. 1181–1184.

Doscher, James, ADXL105: a Lower Noise, Wider Bandwidth Accelerometer Rivals Performance of More Expensive Sensors, 1999 Analog Dialogue 33–6, 1999 Analog Devices.

HONEYWELL, ASA7000, Micromachined Accelerometer, Data Sheet, Jul. 2001.

MOTOROLA, MMA2201D, Surface Mount Micromachined Accelerometer, Data Sheet 2000, pps. 1–8.

Roylance, L.M., et al., A Batch Fabricated Silicon Accelerometer, IEEE Trans Electron Devices, vol. ED–26, No. 12, Dec. 1979, pps. 1911–1917.

Salian, A., et al., A High–Performance Hybrid CMOS Microaccelerometer, Solid–State Sensors and Actuators Workshop, Hilton Head Island, SC, Jun. 4–8, 2000, pps. 285–288.

Roark, R.J., et al. Roark's Formulas for Stress and Strain, 6$^{th}$ Ed. 1989, New York: McGraw–Hill, xiv, vol. 763.

Warren, Keith, Navigation Grade Silicon Accelerometers with Sarificially Etched SIMOX and BESOI Structure, Solid–State Sensors and Actuators Workshop, Jun. 13–16, 1994 Hilton Head Island, SC, pps. 69–72.

ENDEVCO, Variable Capacitance Accelerometer, Model 7596, Data Sheet, 2000.

Chae, Junseok, et al., A Monolithic Three–Axis Silicon Capacitive Accelerometer With Micro–G Resolution, 12$^{th}$ IEEE International Conference on Solid–State Sensors, Actuators and Microsystems, Transducers 2003, Boston, MA.

* cited by examiner

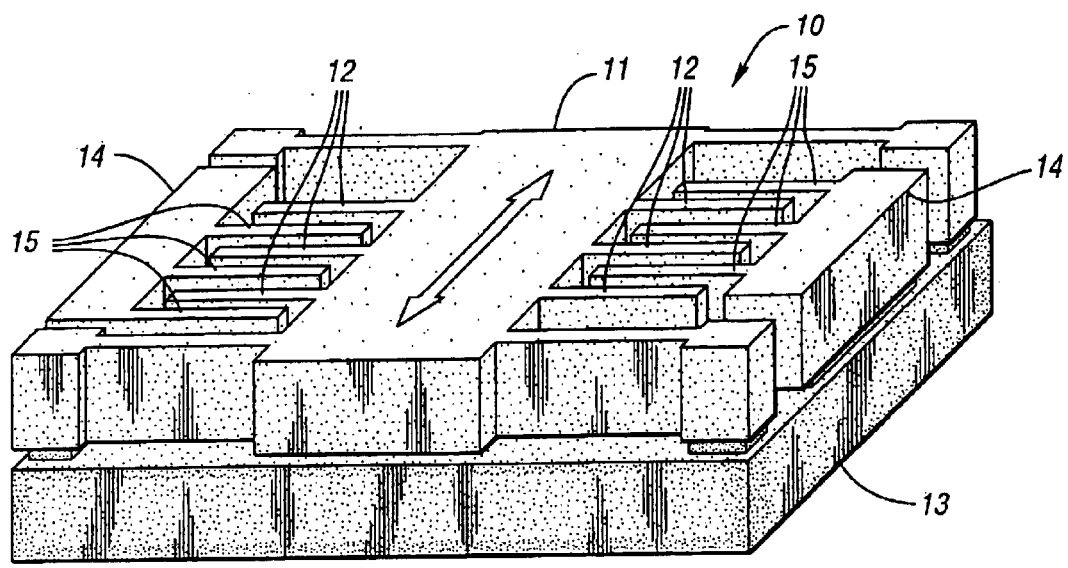
Fig. 1 (PRIOR ART)
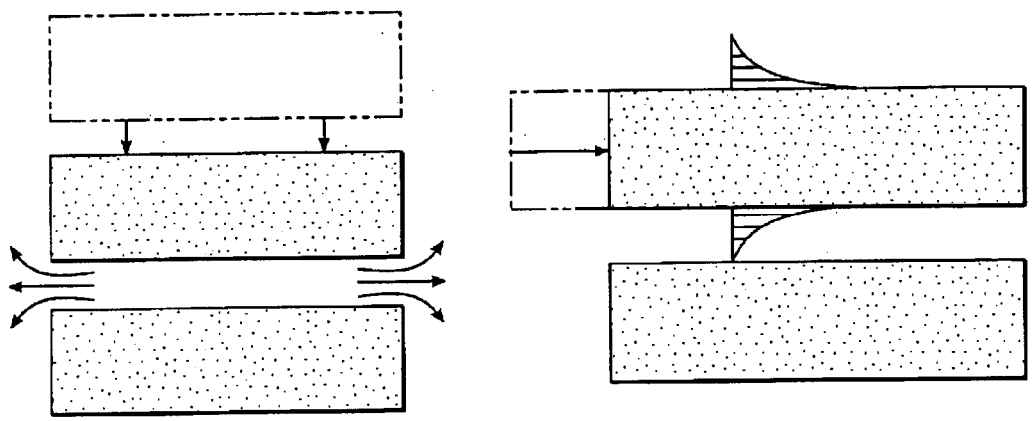
Fig. 2a  Fig. 2b
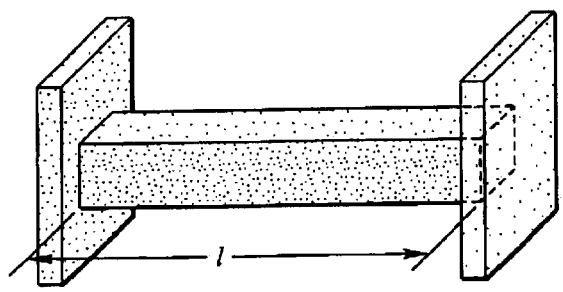
Fig. 3

MICROMACHINED CAPACITIVE LATERAL ACCELEROMETER DEVICE AND MONOLITHIC, THREE-AXIS ACCELEROMETER HAVING SAME

CROSS-REFERENCE TO RELATED APPLICATION

This application claims the benefit of U.S. provisional application Ser. No. 60/440,567, filed Jan. 16, 2003.

STATEMENT REGARDING FEDERALLY SPONSORED RESEARCH OR DEVELOPMENT

This invention was at least partially made with Government support under Contract No. F 30602-98-2-0231, awarded by DARPA. The Government has certain rights in the invention.

BACKGROUND OF THE INVENTION

1. Field of the Invention

This invention relates to micromachined capacitive lateral accelerometer devices and monolithic, three-axis accelerometers having such devices.

2. Background Art

The following references are referred to herein by their reference number:

[1] Yazdi, N., F. Ayazi, and K. Najafi, "Micromachined Inertial Sensors," PROCEEDINGS OF THE IEEE, 1998. 86 (8 Aug. 1998): p. 1640–1658.

[2] Yazdi, N., "Micro-g Silicon Accelerometers with High Performance CMOS Interface Circuitry, in EECS," 1999, The University of Michigan: Ann Arbor.

[3] Analog-Devices, ADXL50, Monolithic Accelerometer with Signal Conditioning, Data Sheet. 1996.

[4] Analog-Devices, ADXL105, High Accuracy +−1 g to +−5 g Single Axis iMEMS Accelerometer with Analog Input. 1999.

[5] Lu, C., M. Lemkin, and B. E. Boser, "Monolithic Surface Micromachined Accelerometer with Digital Output," IEEE JOURNAL OF SOLID-STATE CIRCUITS, 1995, 30 (12 Dec. 1995): p. 1367–1373.

[6] Boser, B. E. and R. T. Howe, "Surface Micromachined Accelerometers," IEEE JOURNAL OF SOLID-STATE CIRCUITS, 1996. 31 (3 Mar. 1996): p. 366–375.

[7] Cross-bow, High Sensitivity Accelerometer, LF Series Data Sheet, 2001.

[8] Luo, H., G. K. Fedder, and L. R. Carley, "1 mG Lateral CMOS-MEMS Accelerometer," in 13TH IEEE INTERNATIONAL CONFERENCE ON MICRO ELECTRO MECHANICAL SYSTEMS (MEMS '00). 2000. Miyazaki, Japan.

[9] Wu, J. and L. R. Carley, "A Low-noise Low-offset Chopper-stabilized Capacitive Readout Amplifier for CMOS MEMS Accelerometers, " in IEEE INTERNATIONAL SOLID STATE CIRCUITS CONFERENCE (ISSCC '02). 2002. San Francisco, Calif.

[10] Lemkin, M., et al., "A Low-noise Digital Accelerometer Using Integrated SOI-MEMS Technology," in 10TH INTERNATIONAL CONFERENCE SOLID-STATE SENSORS AND ACTUATORS (Transducers '99) 1999. Sendai, Japan.

[11] Ishihara, K., et al., "Inertial Sensor Technology Using DRIE and Wafer Bonding with Interconnecting Capability," JOURNAL OF MICROELECTROMECHANICAL SYSTEMS, 1999. 8(4 1999): p. 403–408.

[12] Griffin, W., H. Richardson, and S. Yamanami, "A Study of Squeeze Film Damping," ASME JOURNAL OF BASIC ENGINEERING, 1966: p. 451–456.

[13] Zhang, X. and W. C. Tang, "Viscous Air Damping in Laterally Driven Microresonators," PROCEEDINGS OF THE IEEE MICRO ELECTRO MECHANICAL SYSTEMS, 1994: p. 199–204.

[14] Henrion, W., et al., "Wide Dynamic Range Direct Digital Accelerometer," in Solid-State Sensors and Actuators Workshop, 1990, Hilton Head Island, S.C., USA.

[15] Yazdi, N. and K. Najafi, "All-Silicon Single-Wafer Micro-g Accelerometer with a Combined Surface and Bulk Micromachining Process," JOURNAL OF MICROELECTROMECHANICAL SYSTEMS, 2000. 9(4 Dec. 2000): p. 544–550.

[16] Rudolf, F., et al., "Precision Accelerometers with ug Resolution," SENSORS AND ACTUATORS, A: Physical, 1990, 21(1–3 2 Pt2 1990): p. 297–302.

[17] Input output, Design Through to Production of a MEMS Digital Accelerometer for Seismic Acquisition, 2001.

[18] Xiao, Z., et al., "Laterally Capacity Sensed Accelerometer Fabricated with the Anodic Bonding and the High Aspect Ratio Etching," in 10th INTERNATIONAL CONFERENCE SOLID-STATE SENSORS AND ACTUATORS (Transducers '99), 1999, Sendai, Japan.

[19] Chae, J., H. Kulah, and K. Najafi, "A Hybrid Silicon-On-Glass (SOG) Lateral Micro-Accelerometer with CMOS Readout Circuitry," in 15th IEEE INTERNATIONAL CONFERENCE ON MICRO ELECTRO MECHANICAL SYSTEMS (MEMS '02), 2002, Las Vegas, Nev.

[20] Yazdi, N. and K. Najafi, "All-Silicon Single-Wafer Fabrication Technology for Precision Microaccelerometers," in 9th INTERNATIONAL CONFERENCE SOLID-STATE SENSORS AND ACTUATORS (Transducers '97), 1997, Chicago, Ill.

[21] Doscher, J., "ADXL105: A Lower Noise, Wider Bandwidth Accelerometer Rivals Performance of More Expensive Sensors," 1999.

[22] Honeywell, ASA7000, Micromachined Accelerometer, Data Sheet, 2001.

[23] Motorola, MMA2201D, Surface Mount Micromachined Accelerometer, Data Sheet, 2000.

[24] Roylance, L. M. and J. B. Angell, "Batch-Fabricated Silicon Accelerometer, " IEEE TRANS ELECTRON DEVICES, 1979: p. 1911–1917.

[25] Salian, A., et al., "A High-performance Hybrid CMOS Microaccelerometer," in SOLID-STATE SENSORS AND ACTUATORS WORKSHOP, 2000, Hilton Head Island, S.C.

[26] Roark, R. J. and W. C. Young, "Roark's Formulas for Stress and Strain," 6th ed. 1989, New York: McGraw-Hill. xiv, 763.

[27] Warren, K., "Navigation Grade Silicon Accelerometers with Sacrificially Etched SIMOX and BESOI Structure," in SOLID-STATE SENSORS AND ACTUATORS WORKSHOP, 1994, Hilton Head Island, S.C.

[28] Endevco, "Variable Capacitance Accelerometer, Model 7596, Data Sheet, 2000.

[29] Chae, J., Kulah, H., and Najafi, K., "A Monolithic, 3-Axis Silicon Capacitive Accelerometer with Micro-g Resolution," in 12th IEEE INTERNATIONAL CONFERENCE ON SOLID-STATE SENSORS, ACTUATORS AND MICROSYSTEMS (Transducers '03), Boston, Mass.

The following U.S. Pat. Nos. are related to the present invention: 6,035,714; 6,167,757; 6,286,369; and 6,402,968.

The present and potential future markets of microaccelerometers cover a wide range from automotive, biomedical, computer peripheral, and sport equipment applications which require low/medium sensitivity sensors with moderate noise floor to inertial navigation/guidance systems, seismometry, microgravity measurements which demand high sensitivity with very low noise floor. From among a number of sensing methods, the capacitive sensing technique has become the most attractive recently because it provides high sensitivity, low noise performance, good DC response, low temperature sensitivity, and low power dissipation [1, 2].

FIG. 1 shows a conventional capacitive lateral microaccelerometer, generally indicated at 10. A structural mass 11 (proofmass) having comb fingers 12 made of polysilicon is suspended over a silicon substrate 13 such that it is free to move in response to external acceleration. Electrodes 14 are anchored to the substrate 13, and they also have comb fingers 15 (sense fingers) which form parallel plate capacitors with the fingers 12 of the proofmass 11. When an external acceleration is applied to the accelerometer 10, the proofmass 11 moves against the acceleration due to the inertial force while the electrodes 14 remain fixed, which results in capacitance variation between the fingers 12 of the proofmass 11, and the sense fingers 15 on the two sides of the proofmass 11. By measuring the differential capacitance between the capacitors on the two sides of the proofmass 11, the external acceleration is determined.

Most commercialized or developed lateral capacitance microaccelerometers utilize a cantilever-type electrode configuration for force feedback to achieve a higher dynamic range and higher sensitivity [3–5]. The feedback requires stiff electrodes to ensure stability of sensor operation. Thus, it is important for the electrodes to be stiff enough not to bend when the feedback is applied. However, the cantilever-type configuration does not provide adequate stiffness if the proofmass is heavy such that it requires a large force to move, which is the case for a high performance device.

There is a need for a stiffer electrode configuration to overcome the drawback introduced above. Bridge-type electrode configurations as shown in FIG. 3 have been utilized by many Z-axis accelerometers since first Z-axis devices were developed in the early 1980's. It has not been implemented with lateral devices due to relatively small proofmass of the devices and inherent fabrication properties of planar semiconductor process technology. As proofmasses become larger in order to achieve high performance devices, however, a solution to solve the problem is required.

High-sensitivity and low-noise characteristics are some of the most important factors to achieve high performance acceleration sensors because they determine signal-to-noise ratio (SNR). In order to design a high-sensitivity, low-noise capacitive microaccelerometer, one may reduce the sensing gap and damping, and increase mass of a structure and sensing area [2]. A number of microaccelerometers have been reported since the early 1980's with many methods to improve the sensitivity and noise characteristics. Most of them are Z-axis sensors which are sensitive to the vertical direction of acceleration relative to a substrate because it is easier to fabricate a small sensing gap and large-area electrodes with a huge proofmass than in-plane (lateral) devices. There is a need for a large SNR for capacitive micromachined lateral accelerometers.

Conventional surface micromachined lateral accelerometers utilize a thin polysilicon film as their mechanical structure, which is only about 2 $\mu$m thick, and define their sensing gap by using RIE technology [3, 4, 6–9]. Since the devices have a very small proofmass, they have suffered from Brownian noise, which is created by random motion of gas molecules, such that it is necessary to increase the mass of the structure in order to achieve high performance devices. Many approaches have been performed to increase the thickness of the structure, while maintaining a small sensing gap and large sense area.

Recently, deep RIE technology has been introduced to provide high-aspect ratio etching profile such that it is combined with a silicon-on-insulator (SOI) wafer or wafer bonding technology to increase the thickness of the structure [10, 11]. However, the ratio of the sensing gap and the height of sense electrodes of the lateral devices is still relatively small (20~35) comparing with that of Z-axis devices (>100) due to limitations of the deep RIE technology. With defining the sensing gap by RIE or deep RIE technology, it is not likely to attain the high-aspect ratio which provides high sensitivity required for high performance accelerometers.

The damping in micromachined capacitive devices is viscous damping during the movement of a structure, which is categorized into either squeeze film damping or Couette-flow damping [12, 13], as illustrated in FIGS. 2a and 2b, respectively. Although the damping caused by the Couette-flow is much smaller than the squeeze film's, most micromachined capacitive devices are implemented with the squeeze film damping in order to have higher sensitivity. In order to reduce the damping, vacuum packaging or making holes on the parallel plates to let the fluid between two plates escape through the holes have been developed [14, 15]. It is desirable to avoid vacuum packaging if possible, since it is not cost effective. Out-of-plane (Z-axis) devices have implemented the perforation technique to reduce damping significantly [15]. However, from a manufacturing point-of-view, it is not feasible to perforate the plates of in-plane (lateral) devices because the fabrication process of devices has inherent features of a semiconductor technology, so-called planar technology, which is basically to put down and pattern thin films on a substrate.

The most effective way to reduce the squeeze film damping is to increase the sensing gap ($d_0$). On the other hand, increasing the sensing gap compromises sensitivity of devices.

Another method to achieve a high-sensitivity, low-noise device is to have a large proofmass. It is very desirable to have a large proofmass for capacitive devices since both sensitivity and noise characteristics can be improved. To have a large proofmass, a few powerful methods have been developed: thick silicon of SOI wafer; a full wafer thickness of a silicon wafer; and wafer bonding technology [11, 15–17]. Several Z-axis microaccelerometers with large proofmass, at least 500 $\mu$m thick, have been developed. On the other hand, only a few lateral devices have been reported which have a large proofmass, which is at most 50 $\mu$m thick by implementing the thick silicon of an SOI wafer [10, 11, 18]. A lateral device which has 120 $\mu$m thick proofmass has been previously developed using the silicon-on-glass (SOG) structure [19]. However, there is a need for a thicker proofmass in order to achieve high-sensitivity and low-noise devices.

Most commercialized or developed lateral capacitive microaccelerometers utilize force feedback to achieve a higher dynamic range and higher sensitivity [3–6, 8, 10, 17, 20–25]. Feedback force is applied between two sets of comb fingers, one set attached to the substrate and the other set attached to the proofmass. When a voltage is applied between these comb finger sets, electrostatic force is generated which tends to attract the proofmass toward the fixed fingers. Obviously, it is important that the sense fingers be stiff enough so as not to bend when this force is applied. Otherwise, the feedback force introduces non-stable operation [2].

Many lateral devices which have been commercialized or developed using long and narrow comb fingers on a relatively small proofmass (few µ-gram weight, 2~50 µm thickness). These long and narrow comb fingers cannot be used if the proofmass gets bigger—in the order of milligram weight with full wafer thick (~500 µm) because the fingers are not stiff enough to resist bending in the direction of the applied force. Therefore, a new configuration of electrodes is needed to provide stable operation for a lateral microaccelerometer with high-sensitivity and low-noise floor.

A Z-axis accelerometer has been used in a bridge-type electrode configuration made of either glass wafers or polysilicon [2, 27]. Large stiffness can be attained when thickness of the electrodes to sense direction becomes large. The Z-axis device utilizes either full wafer thick electrodes or stiffeners in the electrode's design [15, 17, 27]. However, it is not feasible to apply those methods to lateral devices due to inherent characteristics of semiconductor planar fabrication techniques. Conventional cantilever-type accelerometers could improve the stiffness of electrodes by increasing the width of them (note that the width of electrodes is the sense direction in lateral devices). Increasing the width of the electrodes is effective in terms of obtaining large stiffness. On the other hand, it consumes overall device area since electrodes occupy most of the area for conventional devices with a comb finger scheme. Thus, it is not a very advantageous method to just simply increase the width of cantilever electrodes for overall performance improvement.

High-sensitivity and low-noise characteristics are some of the most important factors to achieve high performance acceleration sensors because they determine signal-to-noise ratio (SNR). The SNR indicates directly how small the resolution is that the sensors are able to detect. A number of microaccelerometers have been developed since the early 1980's and some of them are commercialized [3, 4, 7, 21, 22, 28].

Most out-of-plane (Z-axis) microaccelerometers, sensitive to vertical direction of acceleration relative to a substrate, provide a few 10's micro-g resolution. On the other hand, in-plane (lateral) devices have a few 100's micro-g resolution because it has easier-to-implement fabrication technology in order to meet high performance requirements for Z-axis devices. Equation (1) below shows three main parameters determining high-sensitivity, low-noise accelerometers: sensing gap ($d_o$); damping (D); and mass of a structure (M):

$$Sensitivity = \frac{\Delta C_{static}}{a} = \frac{\varepsilon_o M}{K} \frac{A}{d_o^2} \quad (1)$$

($\varepsilon_0$: Permittivity, A: Sense area, K: Spring constant, $d_0$: Sensing gap)

$$TNEA = \frac{\sqrt{4 K_B T D}}{M}$$

(TNEA: Total Noise Equivalent Acceleration, $K_B$: Boltzmann Constant, T: Temperature in kelvin, D: Damping, M: Mass of structure)

Although many approaches have been developed in order to improve sensitivity and noise characteristics of lateral accelerometers to be comparable with those of Z-axis devices, high performance lateral devices still require better solutions.

Commercialized or developed capacitive lateral microaccelerometers have used RIE technology to define their sensing gap since it is simple, low-cost and CMOS-fabrication-process compatible. As mentioned earlier, it is necessary to obtain a large sensing area and a small sensing gap for high-sensitivity. The first commercialized capacitive microaccelerometer was developed by Analog Devices, Inc. in 1993. The accelerometer has proofmass and electrodes which are made of 2 µm thick polysilicon from the CMOS process. Due to the small mass of its proofmass, the resolution (noise floor/sensitivity) of the sensor is in the range of mill-g/√Hz which does not satisfy the requirements for high performance applications such as inertial navigation, guidance systems, microgravity measurements. Since the devices are fabricated based on surface micromachining technology, the thickness of the polysilicon is limited to ~5 m with an ~1.3 µm sensing gap, which provides an aspect ratio of only ~4 between the sensing gap and height of the electrodes.

Recently, deep RIE technology was introduced to be capable of developing high-aspect ratio structures. Some lateral microaccelerometers took advantage of the technology to obtain high-sensitivity and low-noise characteristics. Nevertheless, the ratio between the sensing gap and the height of electrodes is still small (20~35) compared with the ratio of Z-axis devices (>100).

Damping is one of the major factors to determine noise floor in microstructure as shown in Equation 1. Most micromachined capacitive devices utilize either squeeze film or Couette-flow damping, as shown in FIGS. 2a and 2b, respectively, as previously mentioned.

Squeeze film damping occurs when two closely spaced plates move toward each other such that the gap distance ($d_0$) changes. When fluid between the plates is squeezed, the fluid moves toward less pressurized space where the squeezed fluid is able to release its pressure, which means fluid tends to move where it is easy to escape from the movement of the plates. Generally, damping is proportional to how difficult the fluid could escape when the two plates move. The gap distance between the two plates is, therefore, the main factor to determine the squeeze film damping. In addition, the squeeze damping is small when one side of the rectangular plates is much larger than the other because it is easy for the fluid to release its pressure by moving along a shorter path toward the larger side, as shown in FIGS. 7a and 7b. In other words, to minimize the squeeze film damping while maintaining the gap distance (and capacitance formed by the two plates), the long rectangular plate design of FIG. 7b takes advantage of the characteristics of the damping to reduce noise floor.

Couette-flow damping, as shown in FIG. 2b, is generated by the motion of a fluid when two plates slide against each other without changing their gap. The main mechanism of the Couette-flow damping is the fluid being dragged by the two plates. Therefore, the gap distance is not a strong function of the damping. With microstructures, the damping caused by the Couette-flow is much smaller compared with the squeeze flow damping introduced above because typically the gap is very small, such as 1~3 µm.

In order to decrease damping, squeeze damping with a large gap or Couette-flow damping is desirable, which compromises the sensitivity of a capacitive device. Equation (2) shows the sensitivity of the device for two damping mechanisms:

$$\text{Sensitivity} \propto \frac{\varepsilon_o A}{d_o^2} \text{ for squeeze damping,} \quad (2)$$

$$\text{Sensitivity} \propto \frac{\varepsilon_o w}{d_o} \text{ for Couette-flow damping}$$

As shown by Equation (2), the squeeze film damping configuration provides higher sensitivity since microstructures have a very small sensing gap ($d_o$). Thus, there is a need to compromise between sensitivity and damping which is a strong parameter to determine noise floor unless a better idea is introduced to avoid tradeoff.

A few approaches to avoid the tradeoff have been presented such as, vacuum packaging and perforation of the moving plate. By vacuum packaging, air molecules between the two plates can be removed such that much less fluid motion is generated when the two plates move toward each other. The vacuum packaging is the ultimate method to reduce the damping although it is expensive. On the other hand, perforation of the moving plate would be a smart way to avoid squeeze film damping. A Z-axis device has implemented this technique, which provides more than 100 times reduction in the damping [20]. However, it is not feasible to perforate the plate of lateral devices because the fabrication procedure has inherent characteristics of a semiconductor planar technology, which is basically to deposit and pattern films on a flat substrate.

SUMMARY OF THE INVENTION

An object of the present invention is to provide a micromachined capacitive lateral accelerometer device having high-sensitivity and low-noise and a monolithic, three-axis accelerometer having such a device.

Another object of the present invention is to provide a micromachined capacitive lateral accelerometer device which utilizes a combined surface and bulk micromachining technology to obtain a very large proofmass and a high-aspect ratio sensing gap to at least one electrode.

Yet another object of the present invention is to provide a micromachined capacitive lateral accelerometer device having reduced damping while maintaining sensitivity.

Yet still another object of the present invention is to provide a micromachined capacitive lateral accelerometer device having a large SNR.

In carrying out the above objects and other objects of the present invention, a micromachined capacitive lateral accelerometer device having an input axis is provided. The device includes at least one electrode having a side surface normal to the input axis. A relatively large proofmass has at least one side surface normal to the input axis and extends along a width of the proofmass. The proofmass is movable against acceleration relative to the at least one electrode due to inertial force along the input axis to obtain a capacitive variation between the at least one electrode and the proofmass. The side surfaces are spaced apart to define a narrow, high-aspect ratio sensing gap which extends along substantially the entire width of the proofmass. The proofmass forms a sense capacitor with the at least one electrode.

The device may be operable at atmospheric pressure.

The proofmass may be formed from a single wafer having a predetermined thickness. The thickness of the proofmass may be substantially equal to the predetermined thickness.

The thickness of the proofmass may be about 500 microns.

The device may further include a support structure to fixedly support the at least one electrode at opposite ends thereof, and the at least one electrode may span the entire width of the proofmass.

The device may comprise a plurality of electrodes. Each of the electrodes may have a side surface normal to the input axis, and the proofmass may have a plurality of side surfaces normal to the input axis which extend the width of the proofmass.

The electrodes may include differential capacitive electrode pairs.

A ratio of the sensing gap to a height of the at least one electrode may be relatively large to provide a high-sensitivity device.

The ratio may be about 70 or greater.

The sensing gap may be about 1 micron.

The height of the at least one electrode may be greater than about 70 microns.

The device may further include a support structure to fixedly support the at least one electrode at opposite ends thereof and movably support the proofmass.

The support structure may include an outer peripheral support rim and high-aspect ratio support springs for suspending the proofmass from the support rim.

The support springs may be polysilicon support springs.

The sensing gap may be substantially uniform or non-uniform.

The at least one electrode may be corrugated.

The device may have top and bottom sides which are mirror images of each other.

The at least one electrode may be made of polysilicon.

The device may further include a second electrode and at least one stiffener interconnecting the first and second electrodes for stiffening the electrodes.

The at least one electrode and a first side of the proofmass which forms the side surface of the proofmass may define elongated rectangular plates.

The plates may be substantially parallel.

The device may be formed from a single semiconductor wafer.

The semiconductor wafer may be a silicon wafer.

The at least one electrode may be surface micromachined.

The proofmass may be bulk micromachined.

The proofmass may be a boron-doped silicon proofmass.

Further in carrying out the above objects and other objects of the present invention, a monolithic, three-axis accelerometer including three individual single-axis accelerometers is provided. At least one of the individual accelerometers is a micromachined capacitive lateral accelerometer device having an input axis. The device includes at least one electrode having a side surface normal to the input axis. A relatively large proofmass has at least one side surface normal to the input axis and extends along a width of the proofmass. The proofmass is movable against acceleration relative to the at least one electrode due to inertial force along the input axis to obtain a capacitive variation between the at least one electrode and the proofmass. The side surfaces are spaced apart to define a narrow, high-aspect ratio sensing gap which extends along substantially the entire width of the proofmass. The proofmass forms a sense capacitor with the at least one electrode.

Two of the individual accelerometers may be in-plane accelerometers and one of the individual accelerometers may be an out-of-plane accelerometer.

Each of the individual accelerometers may be a micromachined capacitive accelerometer device.

Each of the individual accelerometers may have a full-wafer thick semiconductor proofmass.

The three-axis accelerometer may further include a single substrate on which the three individual single-axis accelerometers are integrated.

The three individual single-axis accelerometers may be formed from a single chip.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a perspective schematic view of a prior art lateral micromachined accelerometer;

FIG. 2a is a side view of a pair of rectangular solids which illustrates squeeze film damping;

FIG. 2b is a side view of a pair of rectangular solids which illustrate Couette-film damping;

FIG. 3 is a perspective schematic view of a beam electrode anchored at its ends in a bridge configuration;

FIG. 4b is a sectional view of the device taken along lines 4b—4b in FIG. 4a;

FIG. 5b is a top sectional view of the electrode pairs with stiffeners of FIG. 5a;

DETAILED DESCRIPTION OF THE PREFERRED EMBODIMENTS

Figure 4A:
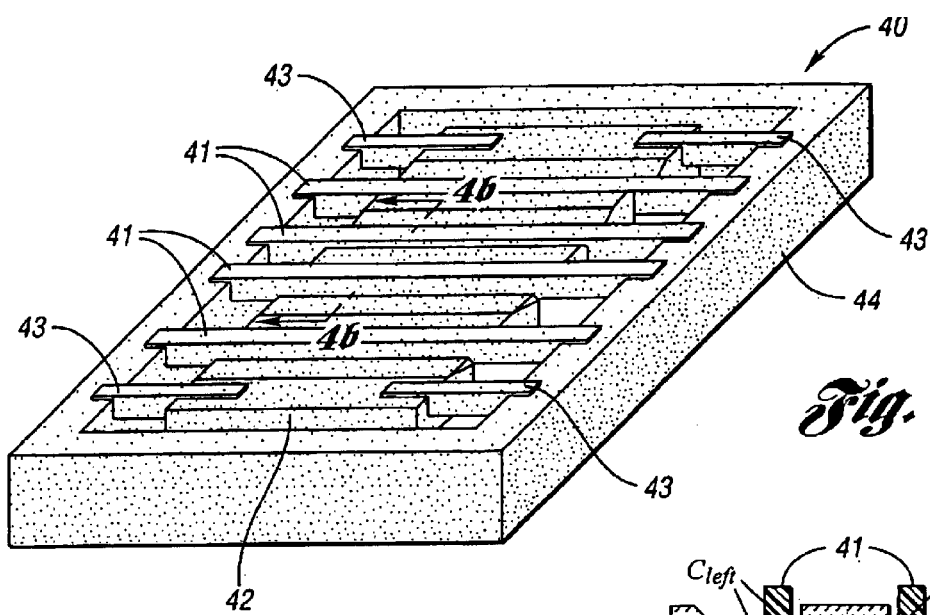
FIG. 4a is a perspective schematic view of a micromachined lateral accelerometer device of a first embodiment of the present invention.

Briefly, what is disclosed herein is a micromachined in-plane (lateral) accelerometer which utilizes a combined surface and bulk micromachining technology. Several novel features are introduced which are incorporated with a sensor structure as well as approaches to achieve a high-sensitivity, low-noise micromachined accelerometer.

A. In-plane Acceleration Sensor Structure
   a. A new sense and drive electrode configuration
      Proofmass itself forms one plate of the parallel-plate capacitor,
      Stiff electrodes using a bridge configuration for a stable operation,
   b. A novel combined surface and bulk micromachining technology to implement the new sensor structure and electrode configuration
      One side of the sense/drive electrode is protected whereas the other side of it is removed at the end of the fabrication using the combined technology,
   c. A three-axis single-chip accelerometer
      Using the combined technology, a monolithic, three-axis accelerometer was developed which demonstrated micro-g resolution for the first time,
B. Approaches to Achieve a High-sensitivity, Low-noise Micromachined Lateral Accelerometer
   a. A high-aspect ratio of sensing gap and electrodes
      The combined technology enables high-aspect ratio sense gap and sense/drive electrodes, which are important to achieve high performance in-plane accelerometers,
   b. A new electrode structure to reduce damping in a lateral micromachined accelerometer
      Corrugated electrode configuration is proposed to reduce damping while maintaining sensitivity of the accelerometer,
   c. A method to obtain a full wafer thick structure for a lateral micromachined accelerometer
      A full wafer thick structure for an in-plane accelerometer is developed by the combined technology to achieve high performance.

As mentioned above, the new accelerometer device utilizes a combined surface and bulk micromachining technology. Unlike conventional surface micromachined lateral devices, it has very large proofmass (a full wafer thick), high-aspect ratio sensing gap to electrodes which result in a high-sensitivity and low-noise accelerometer.

Unlike the conventional micromachined lateral accelerometers which utilize cantilever-type electrode configuration, the new accelerometer preferably has a bridge-type configuration wherein its proofmass itself forms one plate of the parallel-plate capacitor and electrodes the other plate anchored at its ends. One side of the proofmass forms the sense capacitor with the sense/drive electrodes, while the other side of the proofmass is etched and does not form a capacitor with the electrodes. This is important in order to ensure that the sensitivity of the device is not compromised when the proofmass moves.

Although it is proven that the proposed bridge-type electrode configuration provides much higher stiffness than conventional cantilever configuration, the cantilever configuration could also be used if the cantilever electrodes are properly stiffened.

Figure 9:
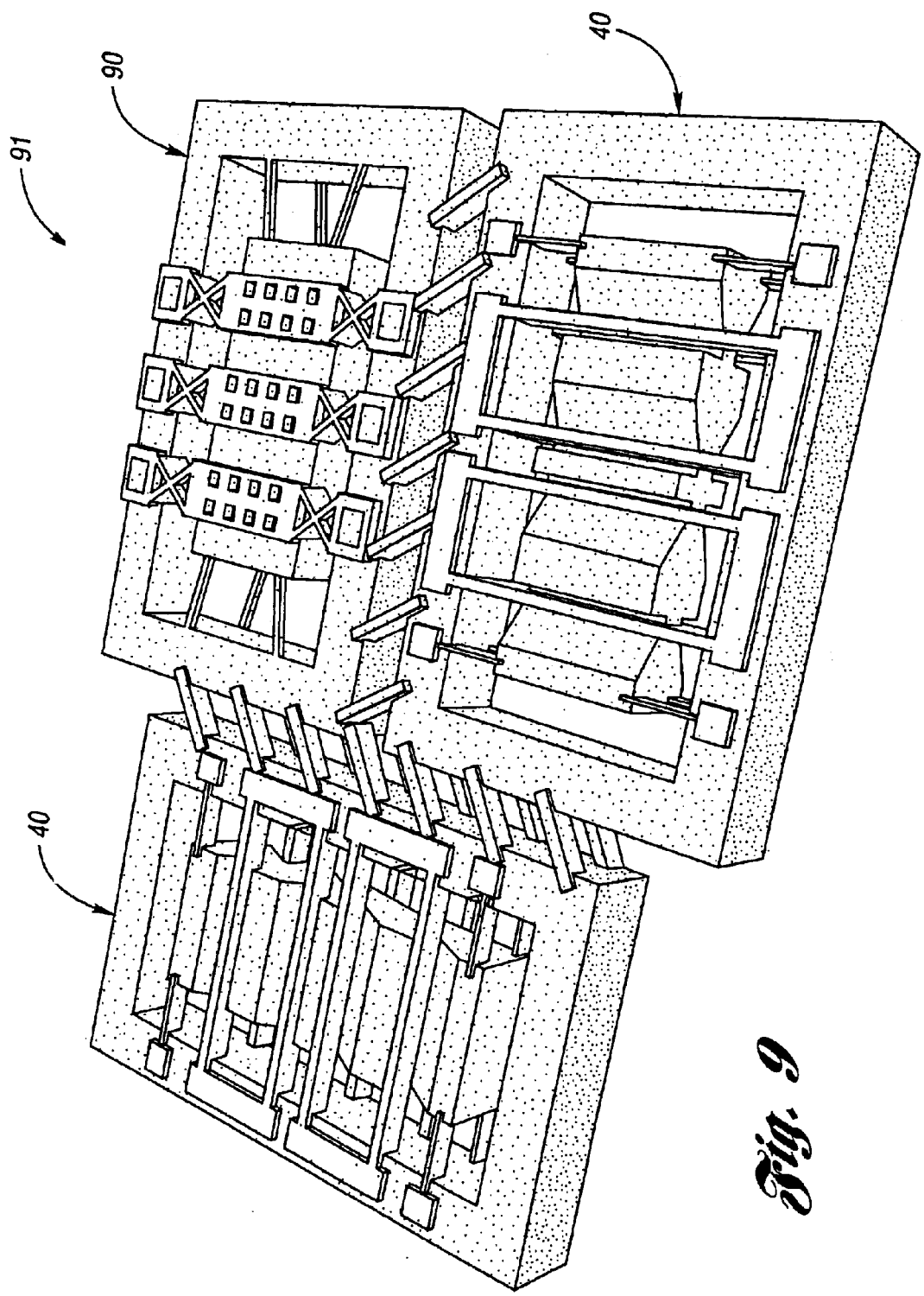
FIG. 9 is a perspective schematic view of a monolithic, three-axis accelerometer of the present invention.

Using the new lateral accelerometers proposed herein, for the first time, a fully-integrated, single-chip, three-axis micro-g accelerometer is possible (i.e., see FIG. 9). All three accelerometers of FIG. 9 satisfy high-performance specifications for inertial navigation applications as described herein.

The lateral accelerometer has a small sensing gap (~1 $\mu$m) and tall electrodes (>70 $\mu$m) by utilizing a combined surface and bulk micromachining technology. The high-aspect ratio of the sensing gap to the electrodes is 70. The micromachined lateral accelerometer has a full wafer thick (~500 $\mu$m) proofmass with the use of a combined surface and bulk micromachining technology.

Figure 4B:
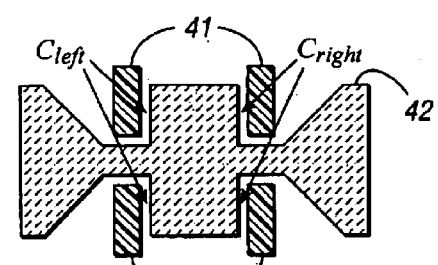

FIGS. 4a and 4b are schematic views of a first embodiment of the new micromachined accelerometer, generally indicated at 40, shown with bridge-type sense/drive electrodes 41. A proofmass 42 is suspended using polysilicon springs 43 and attached to a fixed support frame or rim 44, and the sense/drive electrodes 41 span the entire width of the proofmass 42. The new accelerometer device 40 does not use (but may use) cantilever-type electrodes configuration which is very common with conventional lateral accelerometers but uses the bridge-type electrodes 41. Characteristics of the bridge-type electrode configuration and the benefits of it will be discussed later in detail. Conventional lateral accelerometers have comb fingers to form parallel-plate capacitors, which are sense capacitors, as previously described with reference to FIG. 1. Their proofmasses do not contribute as sense capacitors.

Unlike the conventional micromachined lateral accelerometers, the proofmass 42 itself forms one plate of the parallel-plate capacitor, as best shown in FIG. 4b. Bridge-type electrodes 41 run across the proofmass 42 to form the other plate of the capacitor. Thus, as the proofmass 42 gets bigger, the sense capacitances increase as well, which results in higher sensitivity as can be easily shown by Equation (1). One side of the proofmass 42 forms the sense capacitor with the sense/drive electrodes 41, while the other side of the proofmass 42 is etched and does not form a capacitor with the electrodes 41 as shown in FIGS. 4a and 4b. This is important in order to ensure that the sensitivity of the device 40 is not compromised when the proofmass 42 moves. In other words, one side of the proofmass 42 forms a sense capacitor with the sense/drive electrodes 41 with uniform, narrow, high-aspect ratio sensing gaps ($C_{left}, C_{right}$) utilizing surface micromachining technology, while the other side of it gets etched by bulk micromachining. While it is not necessary for the accelerometer 40 to have mirror image on the bottom side, the mirror image structure on the bottom side helps symmetry of the sensor structure and enables the three-axis single-chip accelerometer of FIG. 9.

In the bridge configuration of FIG. 4a, stiffness (k, spring constant) is improved by a factor of 64 over the conventional cantilever beam configuration (conventional scheme of FIG. 1), while maintaining the same mechanical dimensions of a beam [26]. The length of the sense electrode 41 should be large in order to increase sensing area, which results in sensitivity improvement. Since the stiffness of a beam (electrode) is inversely proportional to the length of the sense electrode, a cantilever-type comb finger scheme cannot easily withstand bending in the face of the large force required if the proofmass 42 becomes heavy. Therefore, either a bridge configuration should be used, or the cantilever beams need to be redesigned to provide adequate stiffness.

Figure 5A:
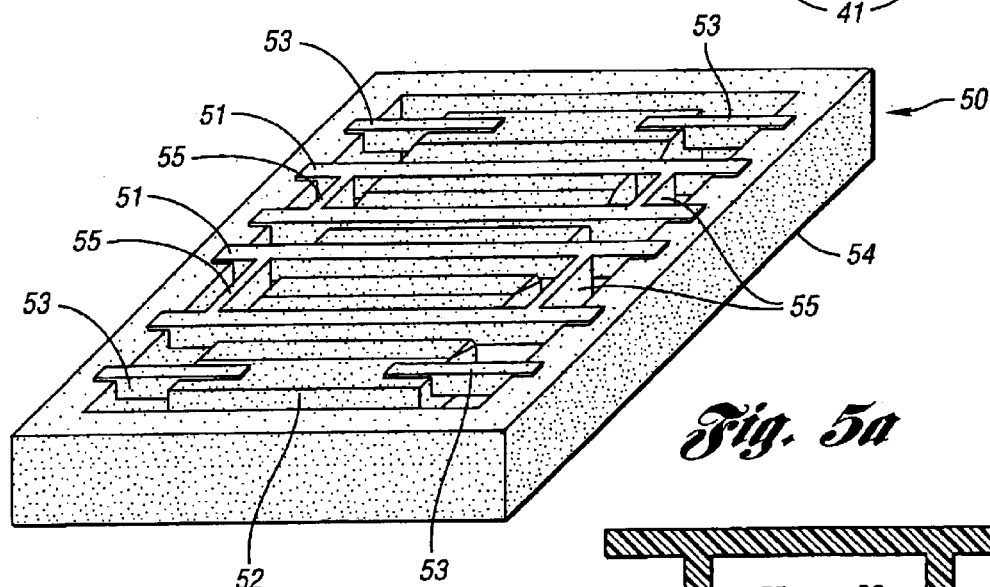
FIG. 5a is a view similar to the view of FIG. 4a of a second embodiment of the invention but now including stiffeners.
Figure 5B:
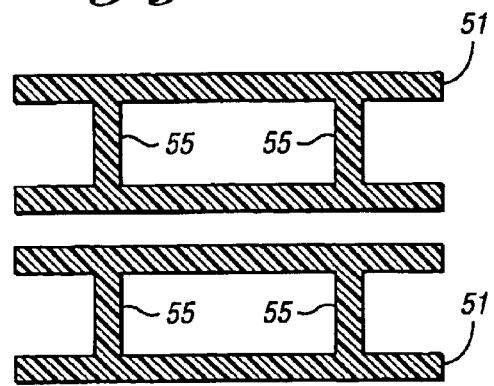

Long electrodes improve sensitivity of the device. The proposed bridge electrode configuration is much stiffer per unit length than cantilever-type electrodes. Therefore, the electrodes can be made long to provide large sense capacitance. The electrodes 41 are preferably made of polysilicon using a "trench refilled technique" in the lateral accelerometer 40. Using this technique, 2 times thicker electrodes are made, which results in 8 times improvement in the stiffness. Also, the stiffness of either the bridge or the cantilever-type accelerometers can be increased by including cross-bar stiffeners 55 as illustrated in FIGS. 5a and 5b. By using these stiffeners 55, electrodes 51 are a few millimeters long, as needed in high-sensitivity devices can be implemented to provide a stable system operation. The accelerometer 50 of FIG. 5a is substantially identical to the accelerometer 40 of FIG. 4a. The accelerometer 50 includes interconnected electrode pairs 51, a proofmass 52, support springs 53 and a supporting frame 54.

The new lateral microaccelerometer implemented with the bridge-type electrodes configuration is provided by the use of a novel combined surface and bulk micromachining technology. As described above, only one side of the bridge-type electrodes forms parallel plate capacitors and the other side of them should not. This is because net capacitance change which indicates the magnitude of external acceleration becomes zero. Furthermore, the residual capacitances formed by the other side reduce the sensitivity of the device significantly. Thus, it is important to only make narrow, uniform and high-aspect ratio capacitors on one side of the electrodes 41 and 51 with the proofmasses 42 or 52, respectively.

FIGS. 6a–6g show a fabrication process for the lateral microaccelerometer 40 with the combined technology. It starts in FIG. 6a with boron-doping a single crystal silicon substrate 60 at 61 on both sides thereof in order to define the proofmass 42 and the rim 44 of the device 40.

Figure 6A:
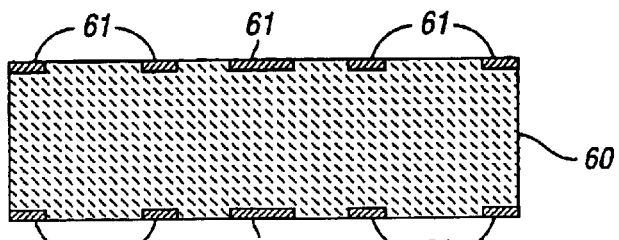
FIGS. 6a–6g are side sectional views which illustrate a fabrication process sequence for making the device of the present invention.
Figure 6B:
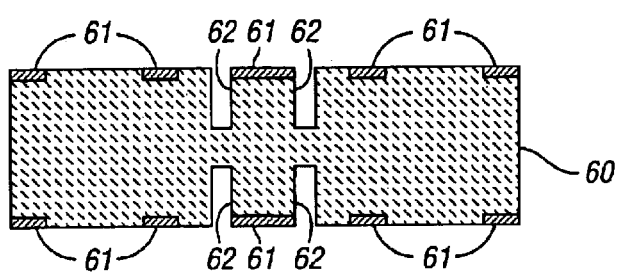

Next, trenches 62 are prepared for refilling with oxide, nitride, and polysilicon by deep RIE technology, as indicated in FIG. 6b.

Figure 6C:
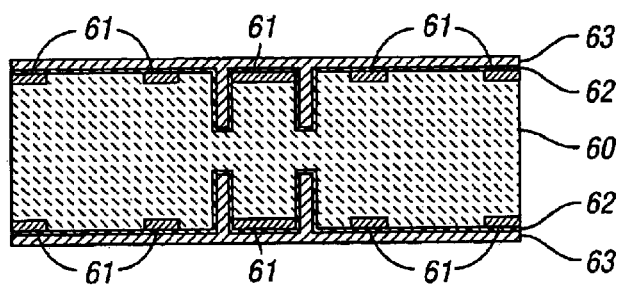

As indicated in FIG. 6c, the trenches 62 are completely refilled with a thin, uniform sacrificial film 62 (oxide), a dielectric layer (nitride), and polysilicon 63. The polysilicon 63 will become the electrodes 41 (i.e., FIG. 6g) and the sacrificial oxide 62 will be etched to define the sensing gaps.

After the trench filling, EDP etches one side of the electrodes 41 (i.e., FIG. 6f), while the other side is protected in order to avoid sensitivity degradation.

Figure 6D:
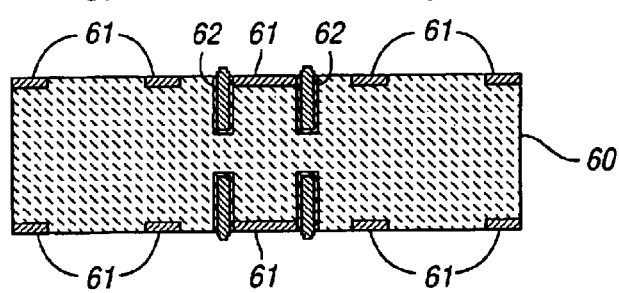
Figure 6E:
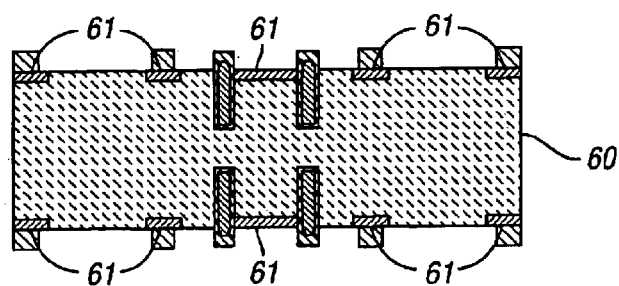
Figure 6F:
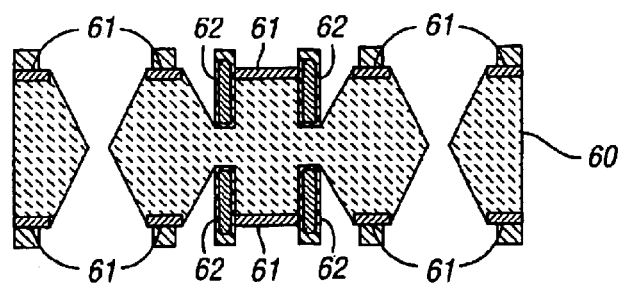
Figure 6G:
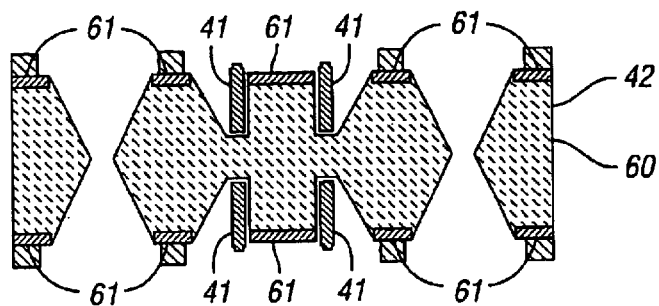
Figures 7A, 7B:
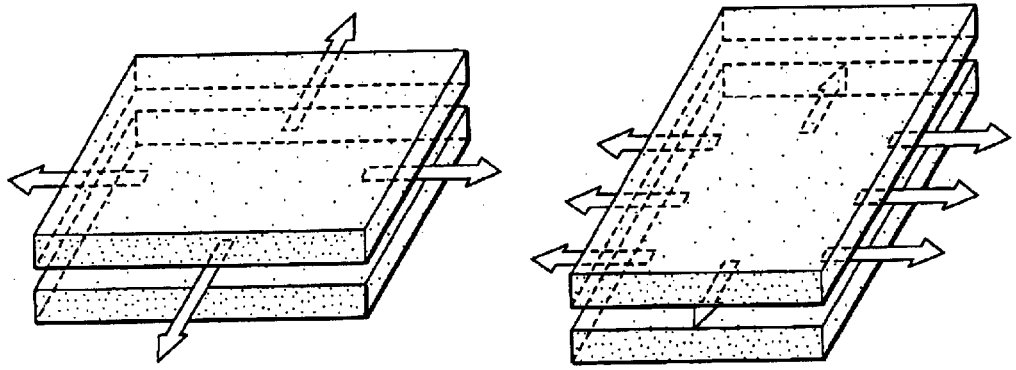
FIG. 7a is a perspective schematic view of a pair of square-shaped plates which illustrates fluid motion for squeeze film damping.
FIG. 7b is a view similar to the view of FIG. 7a with rectangular-shaped plates.

In FIG. 6g, the sacrificial layer 62 is etched to complete the high-aspect ratio electrodes 41 and sensing gaps. The oxide film 62 is a sacrificial, layer removed at the end of the fabrication in order to release the proofmass 42 from polysilicon electrodes 41 (i.e., FIG. 6g).

When patterning the layers 62 and 63, as indicated in FIG. 6d, the proofmass 42 (i.e., substrate 60) forms parallel sense capacitors with both sides of the polysilicon electrodes 41. Electroplating metal on the boron-doped portions 61 of the substrate 60 is shown in FIG. 6e.

Without removing one side of the capacitors, net capacitance change is zero as stated before. Deposition of these thin films 62 and 63 is through surface micromachining technology, which defines fine features very accurately without sacrificing area. However, due to finite film thickness, on the order of $\mu$m's, a heavy structure, which is essential for high-sensitivity and low-noise accelerometers, cannot be built unless a large area is consumed. Bulk micromachining enables the thick structure of the proofmass 42 to overcome the limitations caused by surface micromachining.

Bulk micromachining is preferably performed using ethyl-diamine-pyrazine (EDP). The EDP is a wet etchant which etches silicon along crystallography, which has preferred crystal directionality for etching. The boron-doped silicon is not etched by the etchant such that the proofmass 42 and the rim 44 are protected. Using the directional etching, one side of the electrodes 41 is protected and the other side of them is etched away.

A Three-Axis Single-chip Accelerometer

One of the single axis accelerometers (i.e., 40 or 50) provides acceleration information for only one axis. In order to fully describe acceleration signals of an arbitrary object, a three-axis accelerometer is required. Currently commercialized three-axis accelerometer systems are assemblies of three one-axis devices. They are not only bulky due to macro-scale assembly, but are also expensive because of adjustment of misalignment among axes after the assembly and customized packaging.

Using two of the new lateral accelerometers (i.e., 40 and/or 50) for the first time, a fully-integrated, single-chip, three-axis micro-g accelerometer 91 is possible, as indicated in FIG. 9. One Z-axis accelerometer 90, generally of the type disclosed in the above-noted patents, and two lateral accelerometers 40 can be integrated on a chip to be the three-axis accelerometer 91. With the all-silicon lateral accelerometer 40 introduced above, which satisfies both high-sensitivity and low-noise, a truly inertial-grade, low cost, three-axis, single-chip accelerometer 91 is provided. All three accelerometers 40, 40 and 90 have a full wafer thick proofmass, >1.5 pF/g sensitivity, and sub-$\mu$g/$\sqrt{\text{Hz}}$ Brownian noise floor [29].

The three-axis accelerometer 91 is fabricated monolithically on a single-chip. The fabrication process of the device 91 is identical to that of the lateral devices 40 and 50. The lateral devices 40 and 50 are designed to be technically fully compatible with the Z-axis device 90. The three-axis accelerometer 91 is, therefore, able to be built without any further investigation on the fabrication process.

Figure 8:
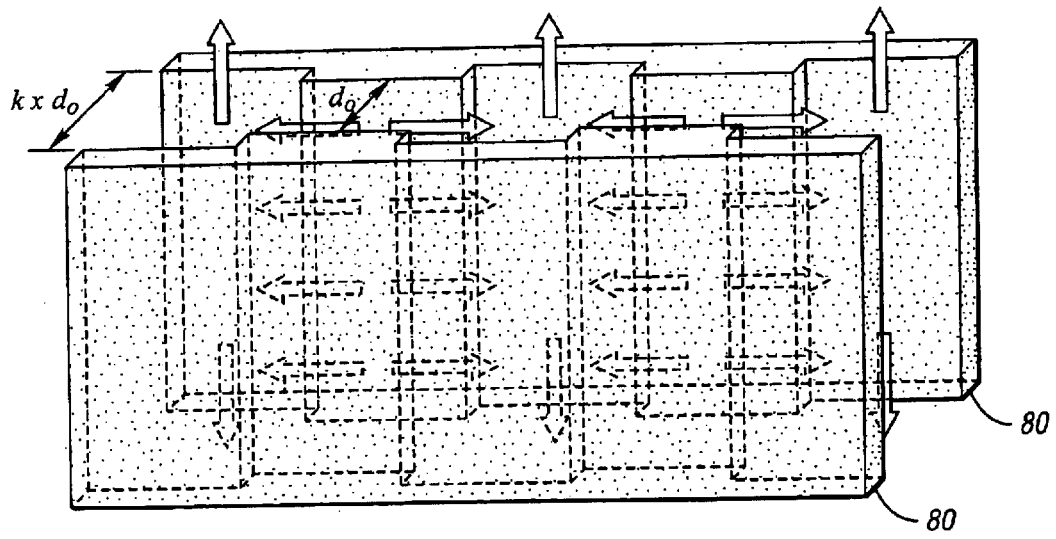
FIG. 8 is a perspective schematic view of a pair of spaced, corrugated electrodes which illustrates fluid motion.

A preferred approach that has been developed is to use corrugated sense electrodes 80 (rectangular plates) of FIG. 8 rather than just plain flat electrodes. By doing so, one is able to reduce the squeeze film damping significantly while maintaining the sensitivity of a capacitive device. FIG. 8 shows a simple schematic of the proposed idea which describes fluid motion for the corrugated electrode configuration. When the plain, flat parallel plates move toward each other, the fluid between the plates escapes through the shortest path which is either top or bottom of the sense electrodes. When the electrodes are corrugated, however, the fluid between the electrodes 80, separated by $d_0$, moves not toward the top or bottom, but laterally (toward the long edge of each set of rectangular plates 80) first. Then, the fluid inside the conduits which are wider (k x $d_0$) than the ones beside them, escapes through the top or bottom because it would experience more difficulty laterally (toward the long edge of the wide conduits). This novel electrode configuration reduces squeeze film damping significantly without compromising sensitivity of capacitive devices.

The proposed accelerometer has been fabricated successfully. A full wafer thick proofmass (~500 $\mu$m), tall sense/drive electrode (~70 $\mu$m), and narrow sensing gap (~1 $\mu$m) are achieved, which presents the ratio of ~70 that is comparable to that of Z-axis devices. The fabricated devices have been tested electrostatically. A pull-in voltage of ~7 V is obtained, which indicates ~4.36 pF/g sensitivity and it matches well with expected value.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A micromachined capacitive lateral accelerometer device having a lateral input axis, the device comprising:

at least one electrode having a side surface normal to the lateral input axis; and a relatively large proofmass having top and bottom surfaces spaced apart along a z-axis substantially perpendicular to the input axis and having a thickness between the top and bottom surfaces, a first pair of side surfaces spaced apart alone the input axis, a second pair of side surfaces spaced apart along a lateral dimension of the proofmass, at least one of the first pair of side surfaces being normal to the input axis and which extends along the lateral dimension of the proofmass and which is movable against acceleration relative to the at least one electrode due to inertial force along the input axis to obtain a lateral capacitive variation between the at least one electrode and the proofmass and wherein the side surface of the at least one electrode and the at least one of the first pair of side surfaces are spaced apart to define a narrow, high-aspect ratio sensing gap which extends along substantially an entire lateral dimension of the proofmass and wherein the proofmass forms a sense capacitor with the at least one electrode.

2. The device as claimed in claim 1, wherein the device is operable at atmospheric pressure.

3. The device as claimed in claim 1, wherein the proofmass is formed from a single wafer having a predetermined thickness and wherein the thickness of the proofmass is substantially equal to the predetermined thickness.

4. The device as claimed in claim 3, wherein the thickness of the proofmass is about 500 microns.

5. The device as claimed in claim 1, further comprising a support structure to fixedly support the at least one electrode at opposite ends thereof and wherein the at least one electrode spans the entire lateral dimension of the proofmass.

6. The device as claimed in claim 1, wherein the device comprises a plurality of electrodes and wherein each of the electrodes has a side surface normal to the input axis and wherein each of the first pair of side surfaces is normal to the input axis and extend the lateral dimension of the proofmass.

7. The device as claimed in claim 6, wherein the electrodes include differential capacitive electrode pairs.

8. The device, as claimed in claim 1, wherein a ratio of the sensing gap to a height of the at least one electrode is relatively large to provide a high-sensitivity device.

9. The device as claimed in claim 8, wherein the ratio is about 70 or greater.

10. The device as claimed in claim 9, wherein the sensing gap is about 1 micron.

11. The device as claimed in claim 10, wherein the height of the at least one electrode is greater than about 70 microns.

12. The device as claimed in claim 1, further comprising a support structure to fixedly support the at least one electrode at opposite ends thereof and moveably support the proofmass.

13. The device as claimed in claim 12, wherein the support structure includes an outer peripheral support rim and high-aspect ratio support springs for suspending the proofmass from the support rim.

14. The device as claimed in claim 13, wherein the support springs are polysilicon support springs.

15. The device as claimed in claim 1, wherein the sensing gap is substantially uniform.

16. The device as claimed in claim 1, wherein the sensing gap is substantially non-uniform.

17. The device as claimed in claim 16, wherein the at least one electrode is corrugated.

18. The device as claimed in claim 1, wherein the device has top and bottom sides which are mirror images of each other.

19. The device as claimed in claim 1, wherein the at least one electrode is made of polysilicon.

20. The device as claimed in claim 1, wherein the device further comprises a second electrode and at least one stiffener interconnecting the first and second electrodes for stiffening the electrodes.

21. The device as claimed in claim 1, wherein the at least one electrode and a first side of the proofmass which forms the at least one of the first pair of side surfaces define elongated rectangular plates.

22. The device as claimed in claim 21, wherein the plates are substantially parallel.

23. The device as claimed in claim 1, wherein the device is formed from a single semiconductor wafer.

24. The device as claimed in claim 23, wherein the semiconductor wafer is a silicon wafer.

25. The device as claimed in claim 1, wherein the at least one electrode is surface micromachined.

26. The device as claimed in claim 1, wherein the proofmass is bulk micromachined.

27. The device as claimed in claim 24, wherein the proofmass is a boron-doped silicon proofmass.

28. A monolithic, three-axis accelerometer comprising three individual single-axis accelerometers wherein at least one of the individual accelerometers is a micromachined capacitive lateral accelerometer device having a lateral input axis, the device comprising:

at least one electrode having a side surface normal to the lateral input axis; and a relatively large proofmass having top and bottom surfaces spaced apart along a z-axis substantially perpendicular to the input axis and having a thickness between the top and bottom surfaces, a first pair of side surfaces spaced apart along the input axis, a second pair of side surfaces spaced apart along a lateral dimension of the proofmass, at least one of the first pair of side surfaces being normal to the input axis and which extends along the lateral dimension of the proofmass and which is movable against acceleration relative to the at least one electrode due to inertial force along the input axis to obtain a lateral capacitive variation between the at least one electrode and the proofmass and wherein the side surface of the at least one electrode and the at least one of the first pair of side surfaces are spaced apart to define a narrow, high-aspect ratio sensing gap which extends along substantially an entire lateral dimension of the proofmass and wherein the proofmass forms a sense capacitor with the at least one electrode.

29. The three-axis accelerometer of claim 28, wherein two of the individual accelerometers are in-plane accelerometers and one of the individual accelerometers is an out-of-plane accelerometer.

30. The three-axis accelerometer of claim 28, wherein each of the individual accelerometers is a micromachined capacitive accelerometer device.

31. The three-axis accelerometer of claim 28, wherein each of the individual accelerometers has a full-wafer thick semiconductor proofmass.

32. The three-axis accelerometer of claim 28, further comprising a single substrate on which the three individual single-axis accelerometers are integrated.

33. The three-axis accelerometer of claim 28, wherein the three individual single-axis accelerometers are formed from a single chip.

* * * * *